(12) United States Patent
Yin et al.

(10) Patent No.: US 9,525,782 B2
(45) Date of Patent: Dec. 20, 2016

(54) USAGE-BASED ADAPTIVE DATA ALLOCATION FOR A TOLL-FREE DATA SERVICE CAMPAIGN

(71) Applicant: Verizon Patent and Licensing Inc., Arlington, VA (US)

(72) Inventors: Fenglin Yin, Lexington, MA (US); Susan Kelly, Maynard, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 184 days.

(21) Appl. No.: 14/276,197

(22) Filed: May 13, 2014

(65) Prior Publication Data

US 2015/0334249 A1 Nov. 19, 2015

(51) Int. Cl.
*H04W 72/00* (2009.01)
*H04W 4/00* (2009.01)
*H04M 3/42* (2006.01)
*H04M 15/00* (2006.01)

(52) U.S. Cl.
CPC .......... *H04M 15/85* (2013.01); *H04M 15/09* (2013.01); *H04M 15/60* (2013.01); *H04M 15/68* (2013.01); *H04M 15/8033* (2013.01)

(58) Field of Classification Search
CPC .............. H04M 15/43; H04M 15/09; H04M 2215/0192; H04M 15/00; H04M 15/80; H04M 15/41; H04M 15/56; H04L 12/1446; H04L 12/1475; H04L 12/1439; H04L 12/1435; G06Q 30/00; G06Q 50/10; H04W 4/24
See application file for complete search history.

(56) References Cited

U.S. PATENT DOCUMENTS

| | | | |
|---|---|---|---|
| 8,687,794 B1* | 4/2014 | Spievak ................. | G06Q 30/02 379/207.02 |
| 2009/0011781 A1* | 1/2009 | Merrill ................... | G06Q 30/02 455/466 |
| 2011/0258031 A1* | 10/2011 | Valin ................... | G06Q 30/0239 705/14.39 |
| 2011/0276679 A1* | 11/2011 | Newton ........... | H04N 21/23103 709/224 |
| 2012/0158829 A1* | 6/2012 | Ahmavaara ........... | H04L 63/101 709/203 |
| 2013/0073357 A1* | 3/2013 | Gillibrand .............. | G06Q 30/02 705/14.11 |

(Continued)

*Primary Examiner* — San Htun

(57) ABSTRACT

A device may receive campaign information for deploying a toll-free data service campaign. The campaign information may identify a total amount of data to be allocated for a toll-free data service associated with the toll-free data service campaign. The device may determine enforcement devices associated with the toll-free data service campaign, and may allocate a portion of data, of the total amount of data, to an enforcement device. The device may receive, from the enforcement device, data usage information that indicates an amount of the portion of data consumed during a first time period, by mobile devices associated with the enforcement device, in association with the toll-free data service campaign. The device may determine, based on the data usage information, an additional amount of data to be allocated to the enforcement device, and may allocate the additional amount of data to the enforcement device.

20 Claims, 12 Drawing Sheets

(56) References Cited

U.S. PATENT DOCUMENTS

| | | | | |
|---|---|---|---|---|
| 2014/0122695 A1* | 5/2014 | Kulikov | ............... | H04L 43/00 |
| | | | | 709/224 |
| 2014/0280758 A1* | 9/2014 | Sharma | ............... | H04W 4/021 |
| | | | | 709/219 |
| 2015/0025976 A1* | 1/2015 | Guo | ............... | G06Q 30/0267 |
| | | | | 705/14.64 |

* cited by examiner

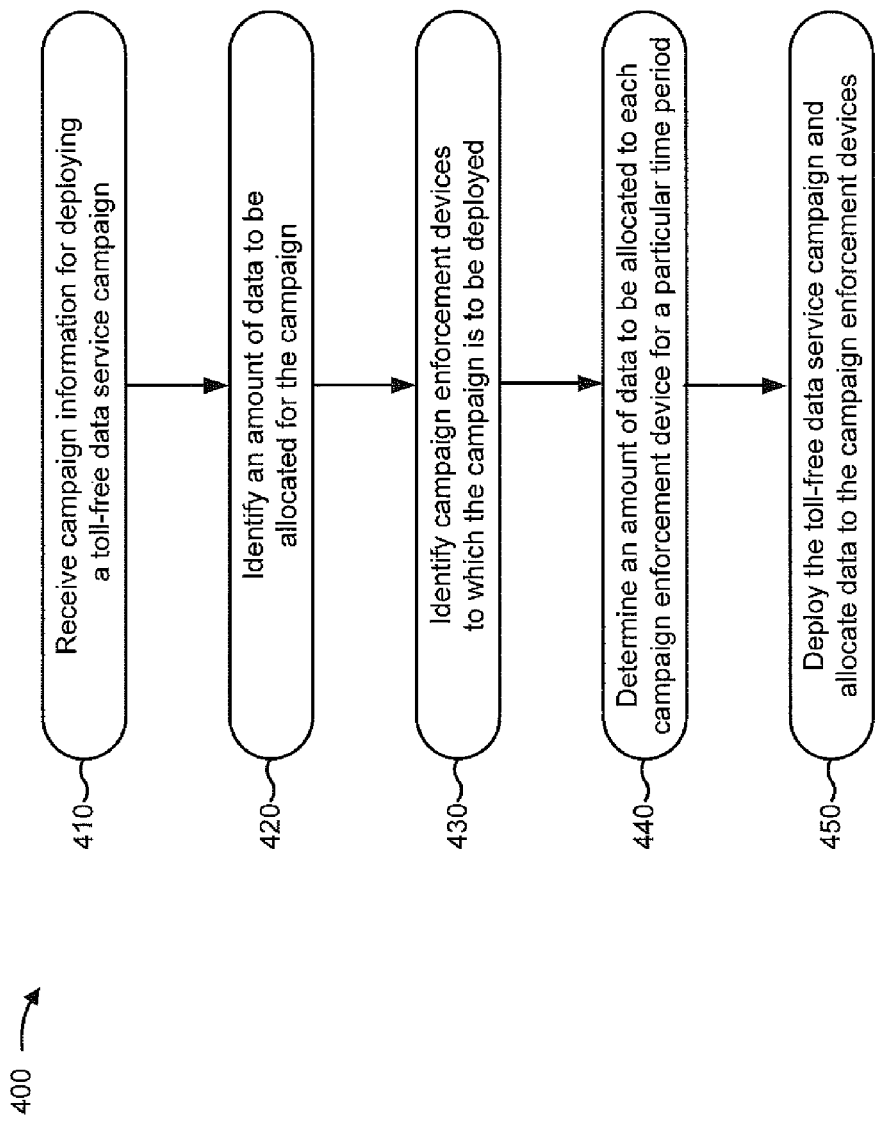

USAGE-BASED ADAPTIVE DATA ALLOCATION FOR A TOLL-FREE DATA SERVICE CAMPAIGN

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

BRIEF DESCRIPTION OF THE DRAWINGS

FIG. 4 is a flow chart of an example process for allocating data for a toll-free data service campaign;

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to access the toll-free data service. A content provider may set up a toll-free data service campaign that describes parameters of a toll-free data service, such as a total amount of data (e.g., a maximum amount) that may be charged to the content provider in association with the toll-free data service. A network operator may use the parameters to deploy the toll-free data service campaign. However, if the toll-free data service campaign is deployed in multiple geographic regions, it may be difficult to determine how much of the total amount of data should be allocated to the different geographic regions. Implementations described herein may assist in efficiently allocating data, to be consumed in association with a toll-free data service campaign, to different geographic regions.

Figure 1:
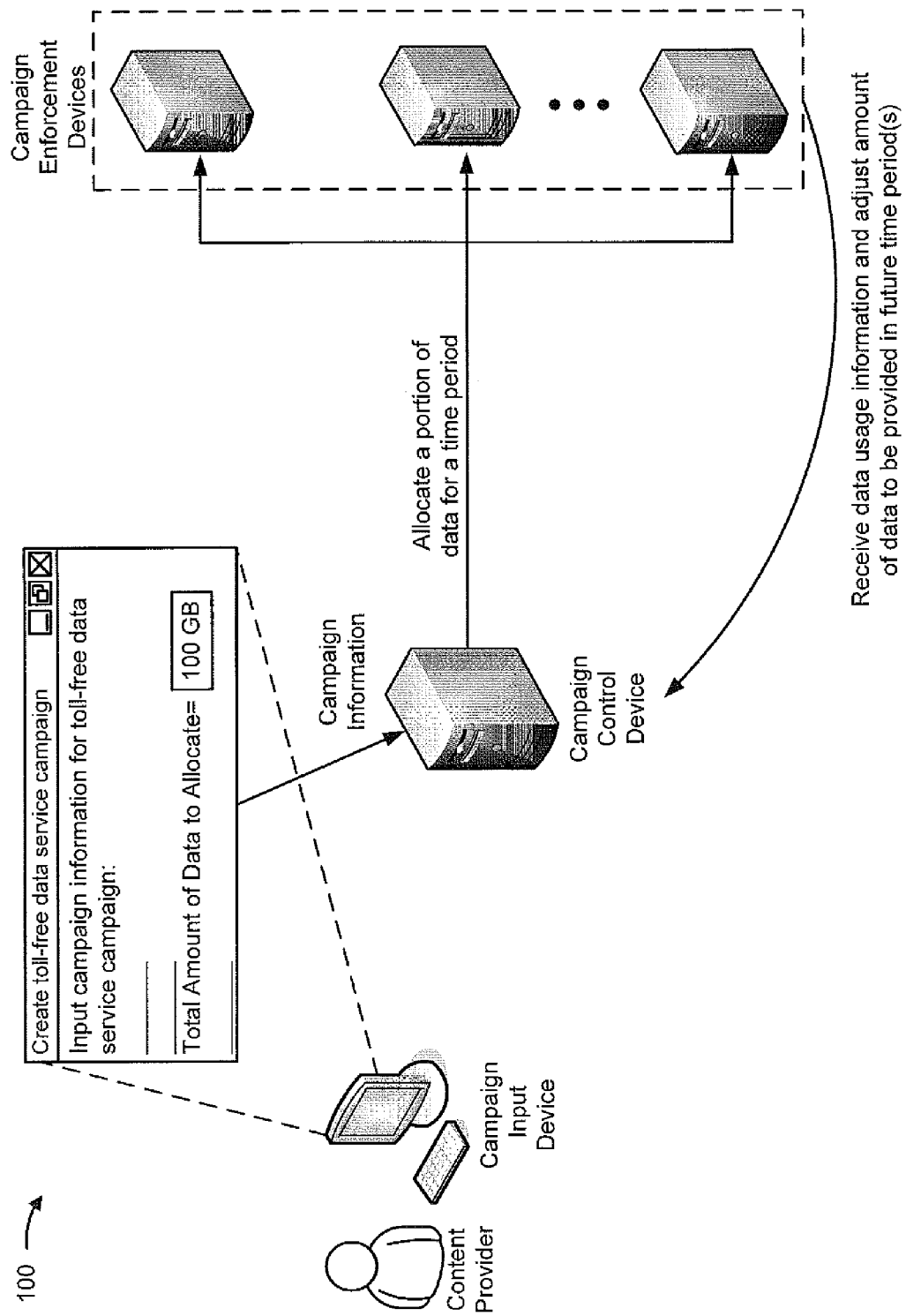
FIG. 1 is a diagram of an overview of an example implementation described herein.

FIG. 1 is a diagram of an overview of an example implementation 100 described herein. As shown in FIG. 1, a content provider may interact with a campaign input device to provide campaign information that describes parameters for deploying a toll-free data service campaign. As shown, the content provider may specify a total amount of data to be allocated for the campaign, shown as 100 gigabytes (GB).

As further shown in FIG. 1, a campaign control device may receive the campaign information for the campaign, and may deploy the campaign based on the campaign information. As shown, the campaign control device may deploy the campaign by allocating the total amount of data to multiple campaign enforcement devices for different time periods. The campaign enforcement devices may be associated with different geographic regions, and may be allocated the same amount of data or different amounts of data. The campaign enforcement devices may record data usage information, such as the amount of data used in a particular time period. As shown, the campaign enforcement devices may provide the data usage information to the campaign control device, and the campaign control device may use the data usage information to adjust an amount of data provided to one or more campaign control devices in future time periods.

In this way, the campaign control device may assist in more efficiently allocating data to different campaign enforcement devices associated with different geographic regions. For example, the campaign control device may balance usage across the different campaign enforcement devices, may reduce an amount of traffic between the campaign control device and the campaign enforcement devices (e.g., by reducing a quantity of data allocation requests from the campaign enforcement devices), etc.

Figure 2:
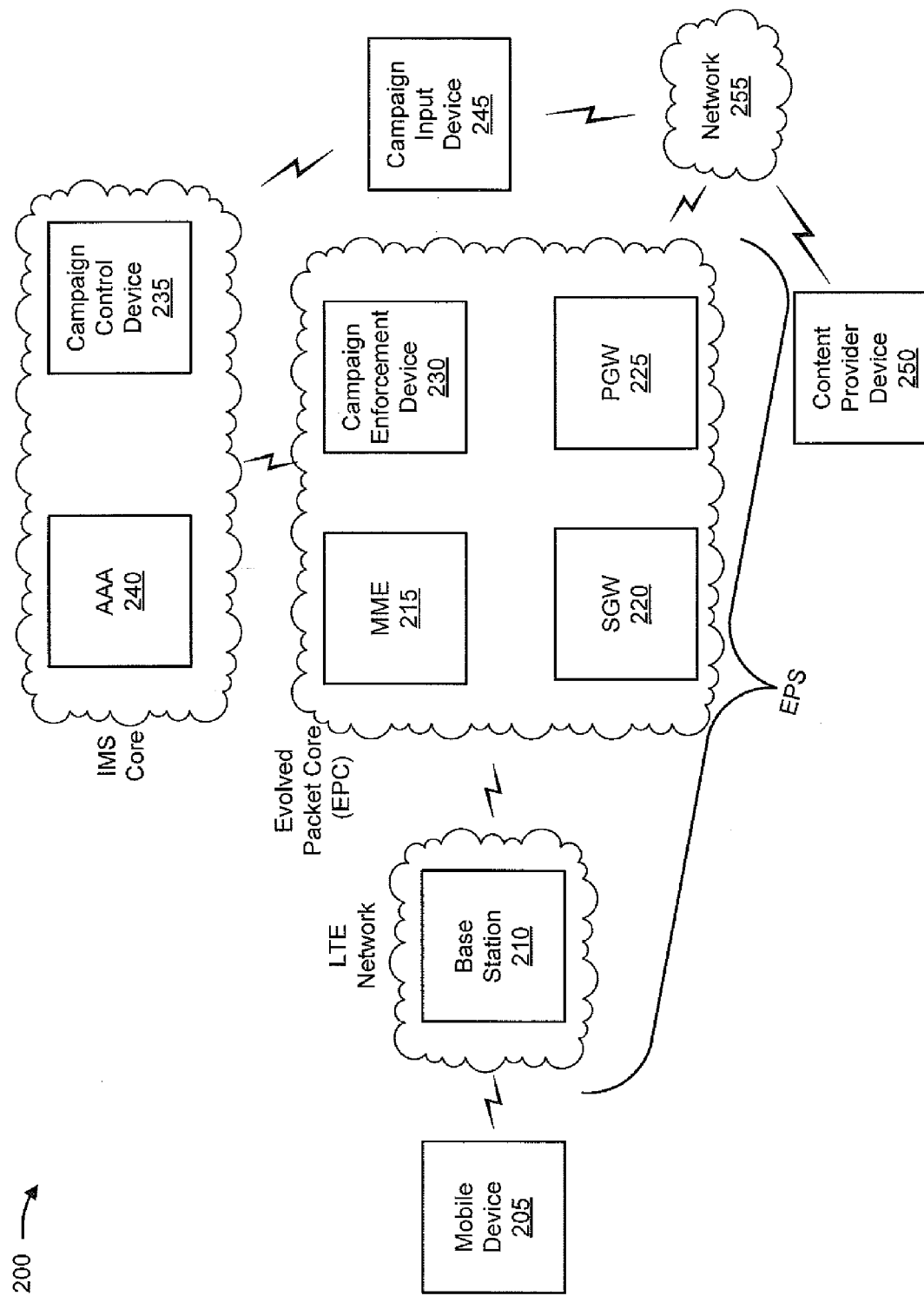
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a content provider device 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or campaign enforcement device 230 that enable mobile devices 205 to communicate with network 255 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or content provider devices 250. Campaign control device 235 and/or AAA 240 may reside in the EPC and/or the IMS core.

Mobile device 205 may include one or more devices capable of communicating with base station 210 and/or a network (e.g., network 255). For example, mobile device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. Mobile device 205 may send traffic to and/or receive traffic from network 255 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server device, an OADM, or a similar device. Campaign enforcement device 230 may receive campaign rules from campaign control device 235, may apply the campaign rules to traffic received from PGW 225, and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, etc.). For example, campaign control device 235 may include a server device or a similar device. Campaign control device 235 may receive campaign information from campaign input device 245, may generate campaign rules based on the campaign information, and may deploy the campaign rules to one or more campaign enforcement devices 230 (e.g., associated with one or more cellular service areas).

AAA 240 may include one or more devices, such as one or more server devices, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server device, or a similar device. Campaign input device 245 may receive input, from a content provider, that identifies campaign information, and may provide the campaign information to campaign control device 235.

Content provider device 250 may include one or more devices capable of providing content (e.g., to mobile device 205). For example, content provider device 250 may include a server device (e.g., a host server, a web server, an application server, etc.) or a similar device. Content provider device 250 may be associated with a content provider that provides a toll-free data service, where the content provider is charged for data usage rather than an end user associated with mobile device 205.

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
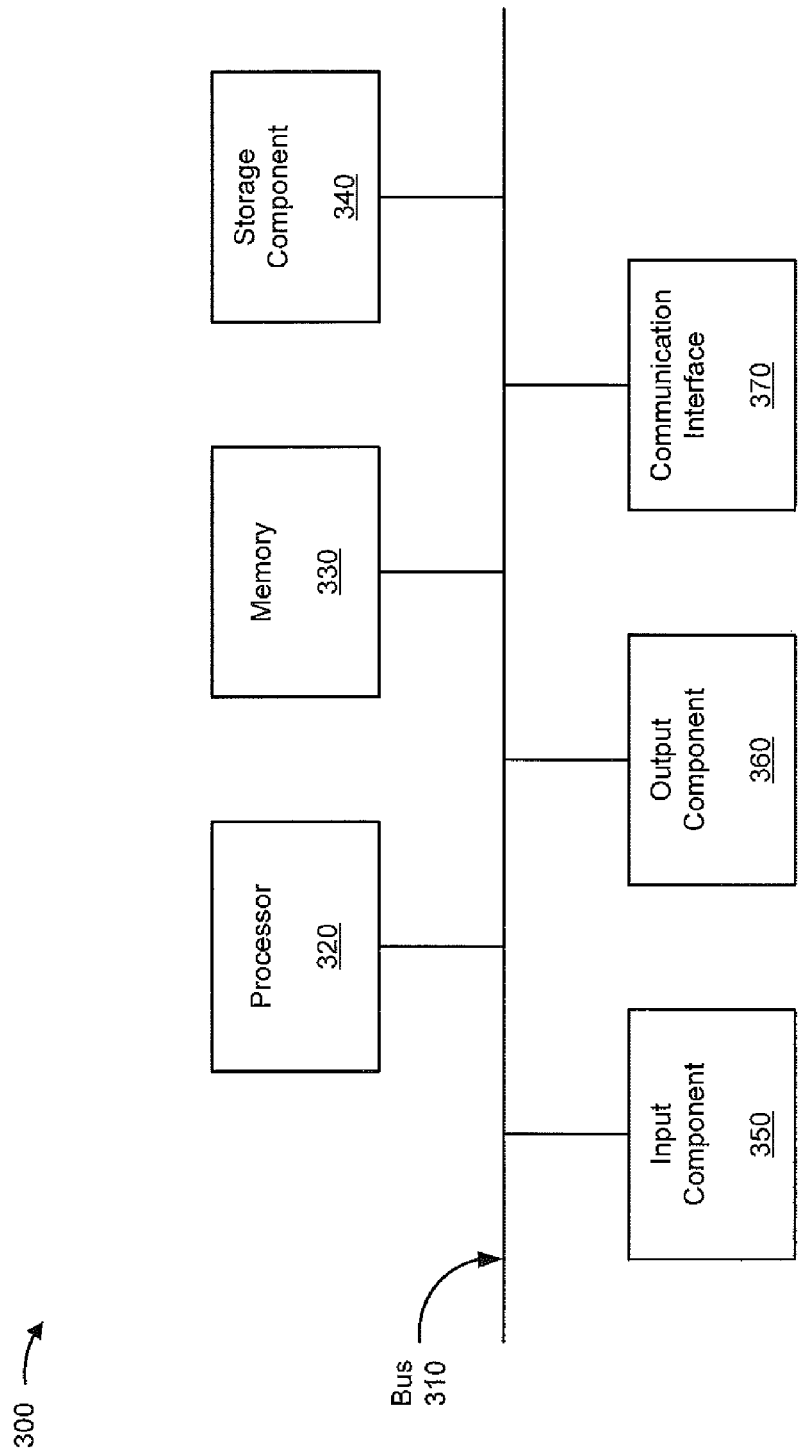
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, and/or content provider device 250. In some implementations, mobile device 205, base station 210, MME 215, SGW 220, PGW 225, campaign enforcement device 230, campaign control device 235, AAA 240, campaign input device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for allocating data for a toll-free data service campaign. In some implementations, one or more process blocks of FIG. 4 may be performed by campaign control device 235. In some implementations, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, and/or content provider device 250.

As shown in FIG. 4, process 400 may include receiving campaign information for deploying a toll-free data service campaign (block 410). For example, campaign control device 235 may receive campaign information for deploying a toll-free data service campaign. A toll-free data service campaign (sometimes referred to herein as a campaign) may refer to a campaign by a content provider where the content provider agrees to be charged for data usage by users of mobile devices 205 that access content provided by the content provider (e.g., rather than the users being charged for the data usage).

Campaign information may include, for example, information that identifies a content provider associated with a campaign, information that identifies one or more content provider devices 250 that provide content associated with the campaign, information that identifies one or more geographic regions associated with the campaign (e.g., associated with one or more campaign enforcement devices 230), information that identifies a time period during which the campaign is active, information that identifies an amount of data (e.g., in bytes) that the content provider will pay for during the campaign (e.g., a maximum amount of data), information that identifies a uniform resource locator (URL) via which a toll-free data service can be accessed for the campaign, etc. In some implementations, an employee associated with the content provider may input campaign information using campaign input device 245, and campaign input device 245 may provide the campaign information to campaign control device 235.

For example, the campaign information may identify a total amount of data (e.g., a maximum amount) for which the content provider agrees to pay during a toll-free data service campaign. Additionally, or alternatively, the campaign information may identify an amount of data (e.g., a minimum amount, a maximum amount, an initial amount, etc.) to be allocated to a geographic region (e.g., a particular campaign enforcement device 230 or a group of campaign enforcement devices 230). Additionally, or alternatively, the campaign information may identify an amount of data (e.g., a minimum amount, a maximum amount, a target amount, etc.) to be allocated during a particular time period (e.g., which may be equal to or less than the time period for the campaign).

As further shown in FIG. 4, process 400 may include identifying an amount of data to be allocated for the campaign (block 420), and identifying campaign enforcement devices to which the campaign is to be deployed (block 430). For example, campaign control device 235 may determine, based on the campaign information, an amount of data to be allocated to the campaign. The amount may include a total amount of data to be allocated over the entire time period of the campaign, an amount of data to be allocated over a subset of the entire time period (e.g., an hour, a day, a week, a month, etc.), an amount of data to be allocated among all campaign enforcement devices 230 associated with the campaign, an amount of data to be allocated to a subset of campaign enforcement devices 230, etc.

Additionally, or alternatively, campaign control device 235 may determine, based on the campaign information, one or more campaign enforcement devices 230 to which the campaign is to be deployed. In some implementations, the campaign information may identify campaign enforcement device(s) 230. Additionally, or alternatively, the campaign information may identify a geographic region, and campaign control device 235 may determine campaign enforcement device(s) 230 based on the geographic region.

As further shown in FIG. 4, process 400 may include determining an amount of data to be allocated to each campaign enforcement device for a particular time period (block 440). For example, campaign control device 235 may determine an amount of data to be allocated to each campaign enforcement device 230 associated with the campaign. The amount of data may be allocated for a particular time period that is a subset of the entire time period over which the campaign is active. Campaign control device 235 may allocate a same amount of data to different campaign enforcement devices 230, or may allocate a different amount of data to different campaign enforcement devices 230. In some implementations, the amount of data to be allocated to a particular campaign enforcement device 230 during the particular time period may be specified in the campaign information.

In some implementations, campaign control device 235 may use data usage information to determine an amount of data to allocate to one or more campaign enforcement devices 230. Data usage information may identify, for example, a quantity (e.g., an average quantity, a maximum quantity, a minimum quantity, etc.) of mobile devices 205 associated with a particular campaign enforcement device 230 (e.g., during a particular time period), a quantity of subscribers associated with a particular campaign enforcement device 230 (e.g., an average, maximum, or minimum quantity, such as during a particular time period), an average amount of data used by mobile devices 205 associated with a particular campaign enforcement device 230 (e.g., during a particular time period), etc.

In some implementations, campaign control device 235 may compare data usage information associated with multiple campaign enforcement devices 230, and may determine an amount of data to allocated to the multiple campaign enforcement devices 230 based on the comparison. For example, if a first campaign enforcement device 230 is associated with twice as many mobile devices 205 or twice the amount of data usage per time period as a second campaign enforcement device 230, then campaign control device 235 may allocate twice the amount of data to the first campaign enforcement device 230 as compared to the second campaign enforcement device 230.

As further shown in FIG. 4, process 400 may include deploying the toll-free data service campaign and allocating data to the campaign enforcement devices (block 450). For example, campaign control device 235 may deploy the campaign. Campaign control device 235 may deploy the campaign by providing campaign rules, that instruct campaign enforcement device 230 how to handle network traffic, to campaign enforcement device(s) 230 associated with the campaign. Campaign control device 235 may generate the campaign rules based on the campaign information, in some implementations. A campaign rule may specify one or more campaign conditions for charging a content provider for data used by a mobile device to access a toll-free data service. In some implementations, campaign control device 235 may provide the campaign rules to campaign enforcement devices 230 identified in the campaign information.

Additionally, or alternatively, the campaign information may identify one or more URLs, network address, etc., associated with a toll-free data service, and campaign control device 235 may provide the URLs to campaign enforcement devices 230 so that campaign enforcement devices 230 may identify traffic to be treated as toll-free (e.g., traffic to be charged to the content provider). Additionally, or alternatively, the campaign information may identify a time period during which the toll-free data service campaign is active, and campaign control device 235 may provide information that identifies the time period to campaign enforcement devices 230 so that campaign enforcement devices 230 may determine a time period during which to treat traffic as toll-free.

In some implementations, campaign control device 235 may deploy the toll-free data service by allocating data to campaign enforcement devices 230. Campaign enforcement devices 230 may use the allocated data for data traffic with mobile devices 205 accessing and/or receiving the toll-free data service. Campaign control device 235 may allocate an initial amount of data, determined as described above, to each campaign enforcement device 230 during an initial time period associated with the campaign. Campaign control device 235 may then receive data usage information from one or more campaign enforcement devices 230, and may use the data usage information to determine an amount of data to be provided to campaign enforcement device(s) 230 during another time period (e.g., a time period subsequent to the initial time period), as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
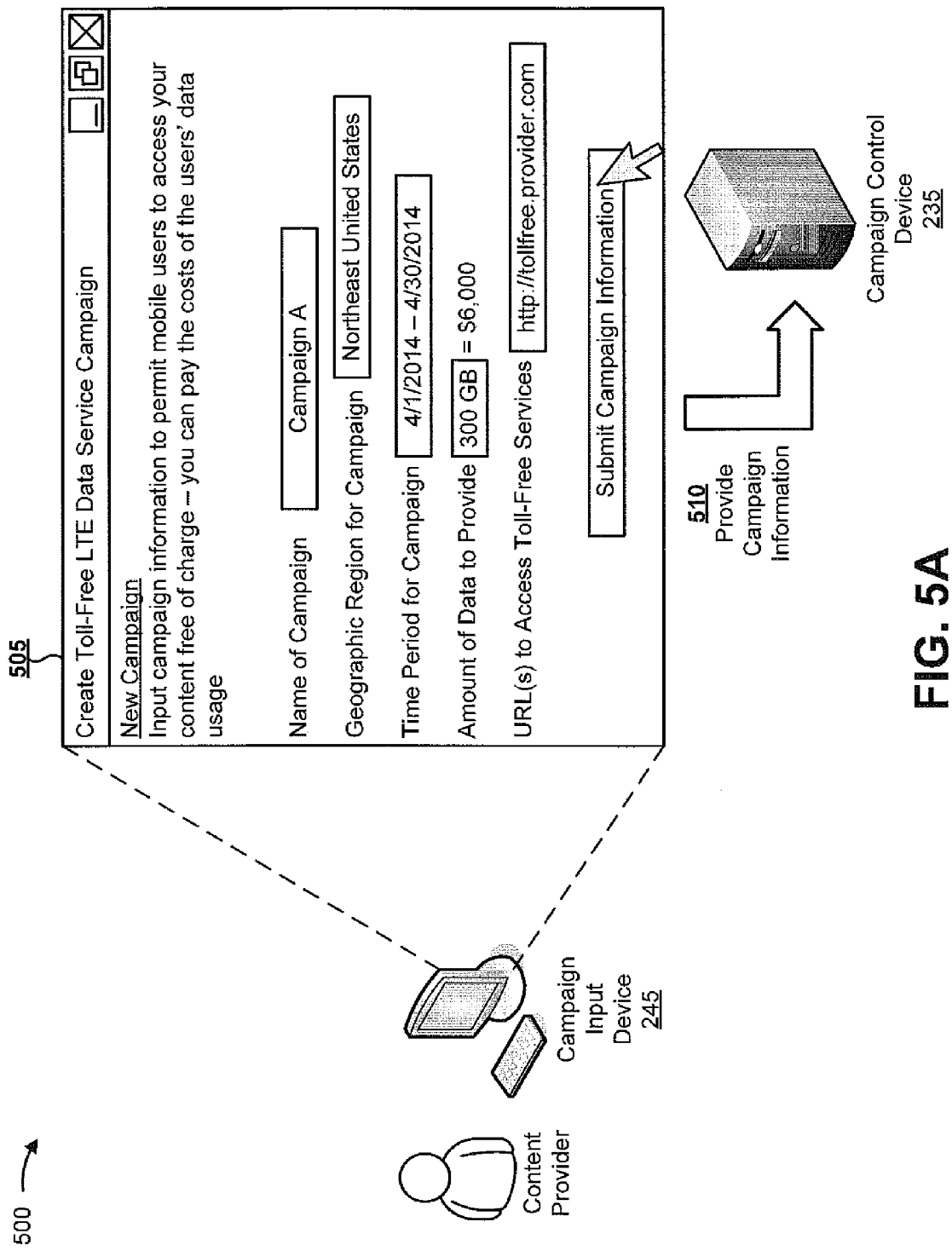
FIGS. 5A and 5B are diagrams of an example implementation relating to the example process shown in FIG. 4.
Figure 5B:
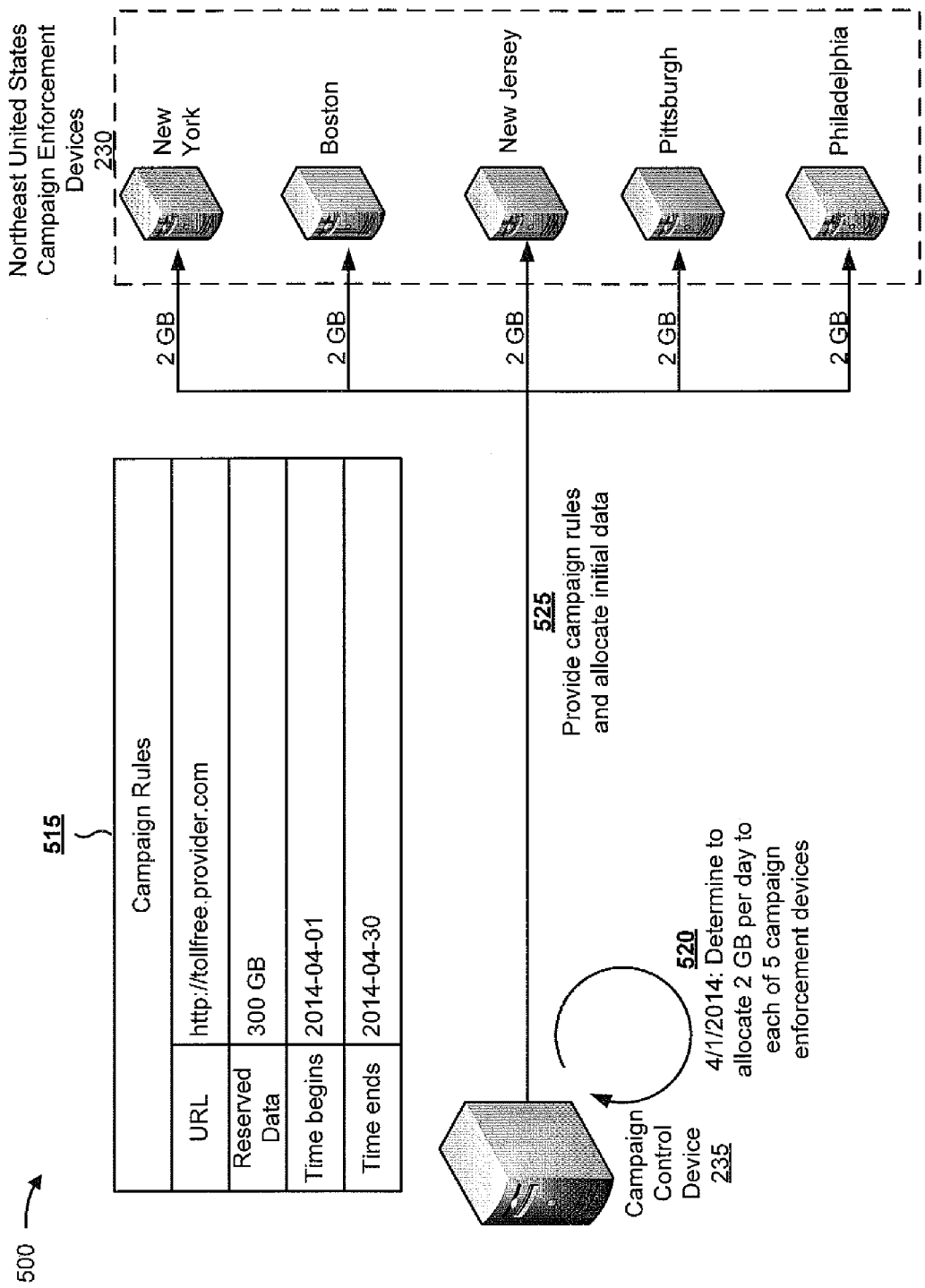

FIGS. 5A and 5B are diagrams of an example implementation 500 relating to example process 400 shown in FIG. 4. FIGS. 5A and 5B show an example of allocating data for a toll-free data service campaign.

As shown in FIG. 5A, and by reference number 505, assume that a content provider interacts with campaign input device 245 to input campaign information to create a toll-free LTE data service campaign. As shown, assume that the content provider identifies a name of the campaign (e.g., a campaign identifier), shown as "Campaign A," a geographic region for the campaign, shown as "Northeast United States," a time period for the campaign, shown as "Apr. 1, 2014-Apr. 30, 2014," an amount of data to be provided with the campaign, shown as "300 gigabytes (GB)," which corresponds to a payment of $6,000 by the content provider, and a URL to access the toll-free data service, shown as "http://tollfree.provider.com."

As further shown, assume that the content provider interacts with an input mechanism, shown as a "Submit Campaign Information" button, to cause campaign input device 245 to provide the campaign information to campaign control device 235, as shown by reference number 510.

As shown in FIG. 5B, and by reference number 515, assume that campaign control device 235 generates campaign rules based on the campaign information. As shown, assume that the campaign rules identify the URL to be used to access the toll-free data service (e.g., http://tollfree.provider.com), a total amount of data reserved for the campaign (e.g., 300 GB), and a time period during which the campaign is active (e.g., from Apr. 1, 2014 through Apr. 30, 2014).

As shown by reference number 520, assume that campaign control device 235 determines to allocate an initial amount of 2 GB of data per day, beginning on Apr. 1, 2014, to each of five campaign enforcement devices 230 located in the Northeast United States. For example, assume that campaign control device 230 determines this initial amount by dividing the total amount of reserved data (300 GB) by the quantity of days in the time period for the campaign (30 days), and dividing the result by the quantity of campaign enforcement devices 230 located in the geographic region associated with the campaign (e.g., 5 campaign enforcement devices 230 located in the Northeast United States) (300 GB/30/5=2 GB).

As shown by reference number 525, assume that campaign control device 235 provides the campaign rules and allocates the initial data to the five campaign enforcement devices 230. In this way, each campaign enforcement device 230 located in the Northeast United States is initially allocated 2 GB of data that may be consumed by mobile devices 205 accessing the toll-free data service during the first day of the campaign (Apr. 1, 2014).

As indicated above, FIGS. 5A and 5B are provided merely as an example. Other examples are possible and may differ from what was described with regard to FIGS. 5A and 5B.

Figure 6:
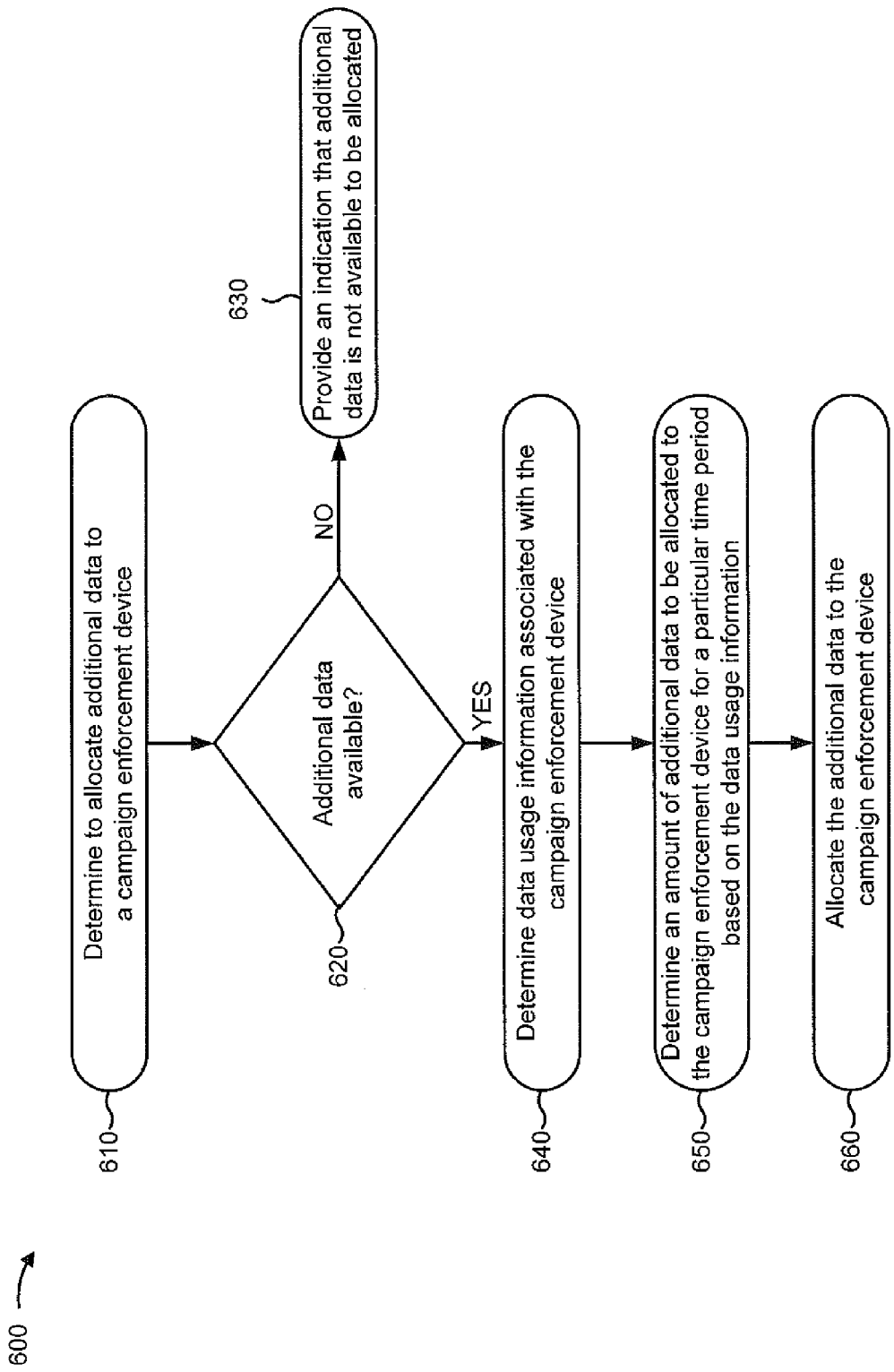
FIG. 6 is a flow chart of an example process for allocating additional data to a toll-free data service campaign based on data usage information.

FIG. 6 is a flow chart of an example process 600 for allocating additional data to a toll-free data service campaign based on data usage information. In some implementations, one or more process blocks of FIG. 6 may be performed by campaign control device 235. In some implementations, one or more process blocks of FIG. 6 may be performed by another device or a group of devices separate from or including campaign control device 235, such as mobile device 205, base station 210, MME 215, SGW 220, PGW 225, campaign enforcement device 230, AAA 240, campaign input device 245, and/or content provider device 250.

As shown in FIG. 6, process 600 may include determining to allocate additional data to a campaign enforcement device (block 610). For example, campaign control device 235 may determine to allocate additional data to campaign enforcement device 230 (e.g., after allocating initial data). In some implementations, campaign control device 235 may determine to allocate the additional data based on determining that a particular amount of time has elapsed (e.g., since a previous allocation of data). For example, campaign control device 235 may periodically allocate additional data to one or more enforcement devices 230 (e.g., once per hour, once per day, once per week, etc.).

Additionally, or alternatively, campaign control device 235 may determine to allocate additional data to campaign enforcement device 230 based on receiving a request for additional data from campaign enforcement device 230. For example, campaign enforcement device 230 may be allocated a particular amount of data, and may monitor usage of the data by mobile devices 205 in association with the toll-free data service. When a threshold amount of the data has been used (e.g., 90% of the data, 100% of the data, a particular quantity of bytes, etc.), or when a threshold amount of the data is unused (e.g., 10% of the data, 0% of the data, a particular quantity of bytes, etc.), then campaign enforcement device 230 may request an allocation of additional data from campaign control device 235. Additionally, or alternatively, campaign enforcement device 230 may periodically request additional data from campaign control device 235 (e.g., once per hour, once per day, once per week, etc.).

As further shown in FIG. 6, process 600 may include determining whether additional data is available (block 620). For example, campaign control device 235 may determine whether additional data is available to be allocated. Campaign control device 235 may monitor a total amount of allocated data (e.g., allocated to multiple campaign enforcement devices 230). In some implementations, campaign control device 235 may determine whether additional data is available to be allocated by comparing the total amount of allocated data to a maximum amount of data available to be allocated for a campaign (e.g., determined based on campaign information input by a content provider). If the total amount of allocated data is less than the maximum amount of data available to be allocated, then campaign control device 235 may determine that additional data is available to be allocated. Otherwise, campaign control device 235 may determine that additional data is not available to be allocated.

In some implementations, campaign control device 235 may determine whether additional data is available to be allocated by determining a difference between the total amount of allocated data and a maximum amount of data available to be allocated for the campaign. For example, campaign control device 235 may subtract the total amount of allocated data from the maximum amount of data available to be allocated to determine a remaining amount of data available to be allocated. Campaign control device 235 may determine whether additional data is available to be allocated based on the remaining amount of data. For example, when the remaining amount of data is greater than a threshold (e.g., zero), then campaign control device 235 may determine that additional data is available to be allocated.

As further shown in FIG. 6, if additional data is not available to be allocated (block 620—NO), then process 600 may include providing an indication that additional data is not available to be allocated (block 630). For example, if campaign control device 235 determines that additional data is not available to be allocated, then campaign control device 235 may provide a notification, to campaign enforcement device 230, that additional data is not available to be allocated. This may cause campaign enforcement device 230 to stop requesting additional data. Additionally, or alternatively, this may cause campaign enforcement device 230 to notify mobile device 205, requesting access to the toll-free data service, that the toll-free data service has expired (e.g., due to the maximum amount of data, for the campaign, being consumed).

As further shown in FIG. 6, if additional data is available to be allocated (block 620—YES), then process 600 may include determining data usage information associated with the campaign enforcement device (block 640). For example, if campaign control device 235 determines that additional data is available to be allocated, then campaign control device 235 may determine data usage information associated with the campaign enforcement device. Data usage information may refer to, for example, an amount (e.g., a quantity, a percentage, etc.) of allocated data consumed by mobile devices 205 associated with campaign enforcement device 230 (or a group of campaign enforcement devices 230), an amount of allocated data consumed in a particular time period, an average amount of allocated data consumed over multiple time periods, etc.

In some implementations, campaign enforcement device(s) 230 may periodically provide data usage information to campaign control device 235. Additionally, or alternatively, campaign enforcement device 230 may provide the data usage information to campaign control device 235 when requesting additional data. Additionally, or alternatively, campaign control device 235 may periodically request the data usage information from campaign control device 230, and may receive the data usage information based on the request.

As further shown in FIG. 6, process 600 may include determining an amount of additional data to be allocated to the campaign enforcement device for a particular time period based on the data usage information (block 650), and allocating the additional data to the campaign enforcement device (block 660). For example, campaign control device 235 may determine an amount of additional data to be allocated to campaign enforcement device 230 for a particular time period (e.g., a time period subsequent to a time period of a previous allocation of data). Campaign control device 235 may determine the amount of additional data to be allocated based on the data usage information and/or based on a set of allocation rules (e.g., input by a network administrator and/or stored by campaign control device 235).

In some implementations, the time period may be a fixed length, and/or multiple time periods may be non-overlapping. For example, campaign control device 235 may allocate data every 24 hours. In some implementations, the time period may be a variable length. For example, campaign control device 235 may allocate data based on a request received from campaign enforcement device 230. In this case, the request may be used to identify the length of the time period (e.g., from a previous allocation until a request for an allocation of additional data). Additionally, or alternatively, multiple time periods may overlap.

As an example, campaign control device 235 may compare an amount of data consumed during a first time period to an amount of data allocated for the first time period to determine an amount of additional data to allocate for a second time period. For example, assume that campaign control device 235 allocates 10 GB of data to campaign enforcement device 230 for a first day of the campaign, and receives data usage information indicating that mobile devices 205 that request access to the campaign using campaign enforcement device 230 consumed 5 GB of data during the first day of the campaign. In this case, campaign control device 235 may not allocate any additional data for the second day, under the assumption that mobile devices 205 will also consume 5 GB on the second day, and campaign enforcement device 230 has already been allocated that 5 GB (e.g., remaining from the initially allocated 10 GB).

As another example, assume that mobile devices 205 consumed 8 GB of data of the initial 10 GB on the first day. In this case, campaign control device 235 may allocate 6 GB of data for the second day, so that the remaining amount of allocated data (2 GB) and the additional amount of allocated data (6 GB) will satisfy the data demand from mobile devices 205 (8 GB) on the second day of the campaign.

In some implementations, mobile devices 205 may consume all of the data allocated to campaign enforcement device 230 before the first day elapses. In this case, campaign enforcement device 230 may request additional data from campaign control device 235. Campaign control device 235 may determine an amount of additional data to be allocated based on the portion of the time period (e.g., the portion of the first day) that has elapsed. For example, if mobile devices 205 consumed the 10 GB of data in half of the first day, then campaign control device 235 may allocate an additional 10 GB of data to campaign enforcement device 230 for the remainder of the first day, under the assumption that mobile devices 205 will also consume 10 GB in the second half of the first day. As another example, campaign control device 235 may allocate an additional 30 GB of data to campaign enforcement device 230, with 10 GB being allocated for the second half of the first day, and 20 GB being allocated for the second day. In this way, campaign control device 235 may reduce the likelihood that campaign enforcement device 230 will request additional data on the second day, thereby reducing network traffic.

Although described above as using an amount of data consumed during one time period to determine an amount of additional data to allocate, campaign control device 235 may use an amount of data consumed during multiple time periods (e.g., an average amount of data consumed during multiple time periods) to determine an amount of additional data to allocate, in some implementations. Additionally, or alternatively, campaign control device 235 may use data usage information from multiple campaign enforcement devices 230 to determine an amount of additional data to allocate to a campaign enforcement device 230. In some implementations, campaign enforcement device 230 may request a particular amount of additional data, and campaign control device 235 may provide an amount of data that is different from the requested amount.

In some implementations, campaign control device 235 may use data usage information from a first campaign enforcement device 230 to determine an amount of additional data to allocate to a second campaign enforcement device 230. For example, a first and second campaign enforcement device 230 may share similar characteristics (e.g., associated with a similar quantity of users (within a threshold amount), associated with a similar quantity of mobile devices 205, associated with a similar geographic region, etc.), and campaign control device 235 may use data usage information from the first campaign enforcement device 230 to determine an amount of data to allocate to the second campaign enforcement device 230. Additionally, or alternatively, the data usage information may indicate that a first campaign enforcement device 230 uses a large amount of data (e.g., as compared to other campaign enforcement devices 230), and may use this information to determine an amount of data to allocate to the second campaign enforcement device 230.

In some implementations, campaign control device 235 may store an indication of an amount of additional data to allocate to a particular campaign enforcement device 230 after receiving a request for the additional data from the particular campaign enforcement device 230. Campaign control device 235 may update the indication to a different amount of additional data based on data usage information, and/or based on a quantity of requests received from the particular campaign enforcement device 230 during a particular time period.

For example, assume that campaign control device 235 stores an indication to allocate 2 GB of data to campaign enforcement device 230 per day. Further, assume that during the first day of the campaign, campaign enforcement device 230 requests additional data, indicating that a threshold amount of the 2 GB has been consumed (e.g., 90%, 100%, etc.). Based on the request, campaign control device 235 may provide an additional 2 GB of data to campaign enforcement device 230, and may update the indication to indicate that 4 GB of additional data is to be allocated to campaign enforcement device 230 when a subsequent request is received.

As another example, campaign control device 235 may first update the indication to indicate that 4 GB of additional data is to be allocated to campaign enforcement device 230, and may provide the 4 GB of additional data to campaign enforcement device 230 based on the request. If campaign control device 235 receives another request from campaign enforcement device 230 on the first day of the campaign, campaign control device 235 may again update the indication (e.g., to 8 GB). In this way, campaign control device 235 may reduce a quantity of requests from campaign enforcement device 230, and may adjust an amount of data to allocate based on data usage information (e.g., a quantity of requests for data received during a particular time period).

In some implementations, campaign control device 235 may allocate different amounts of additional data to different campaign enforcement devices 230 based on respective data usage information associated with each campaign enforcement device 230. In this way, campaign control device 235 may balance data usage across multiple geographic regions (e.g., multiple campaign enforcement devices 230), and may reduce a quantity of traffic (e.g., requests for additional data, responses to the requests, etc.) between campaign control device 235 and campaign enforcement devices 230.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
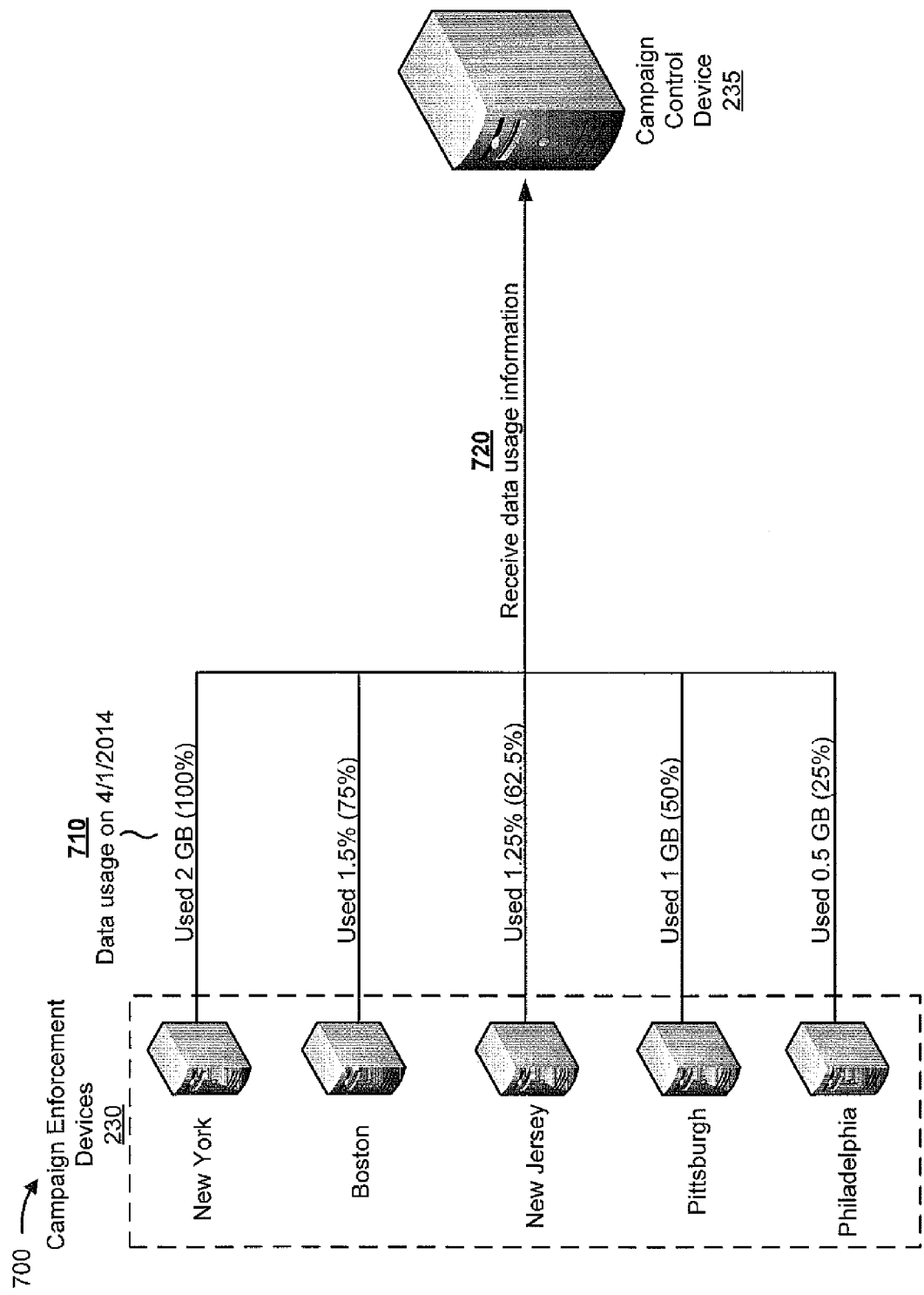
FIGS. 7A-7C are diagrams of an example implementation relating to the example process shown in FIG. 6.
Figure 7B:
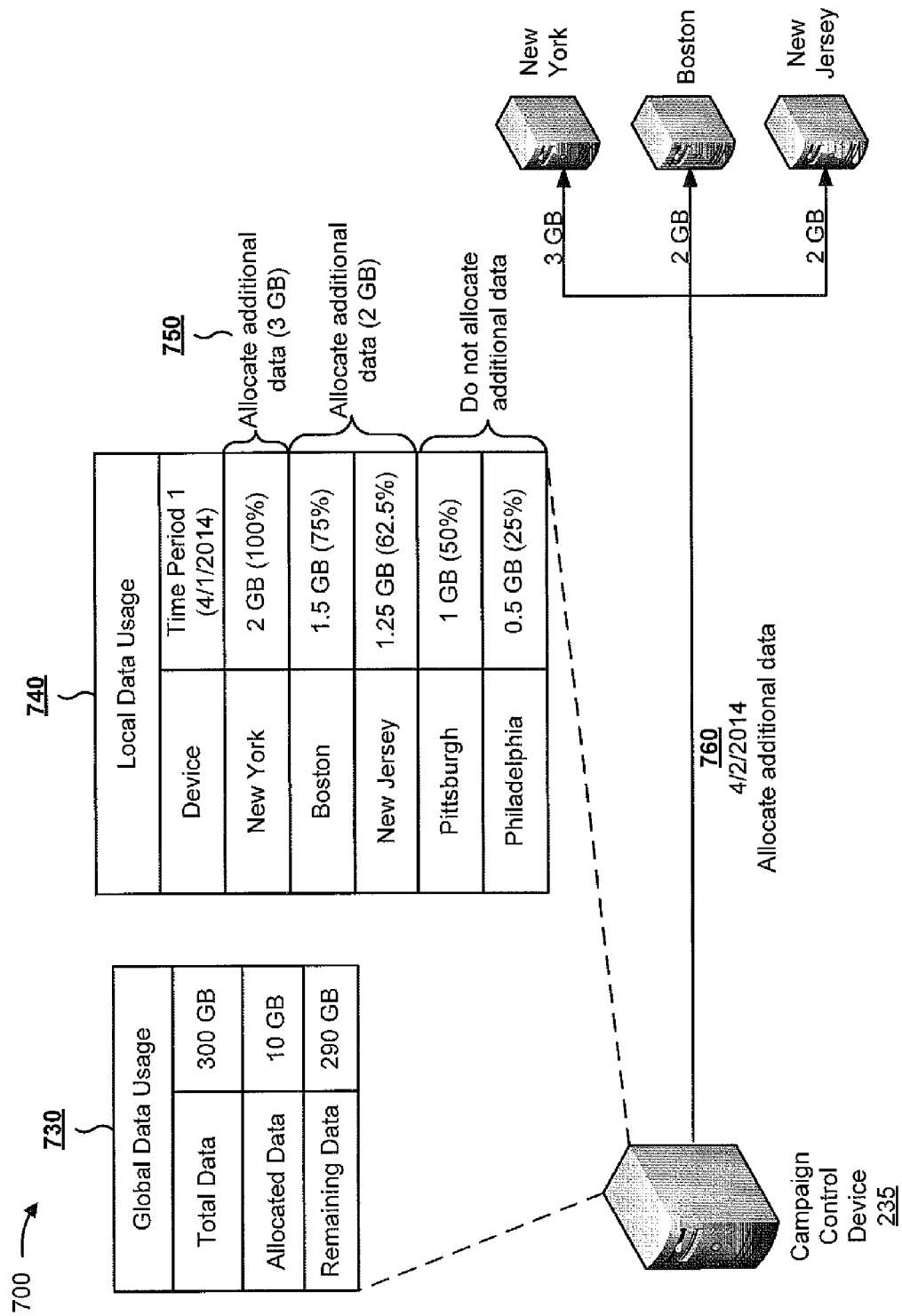
Figure 7C:
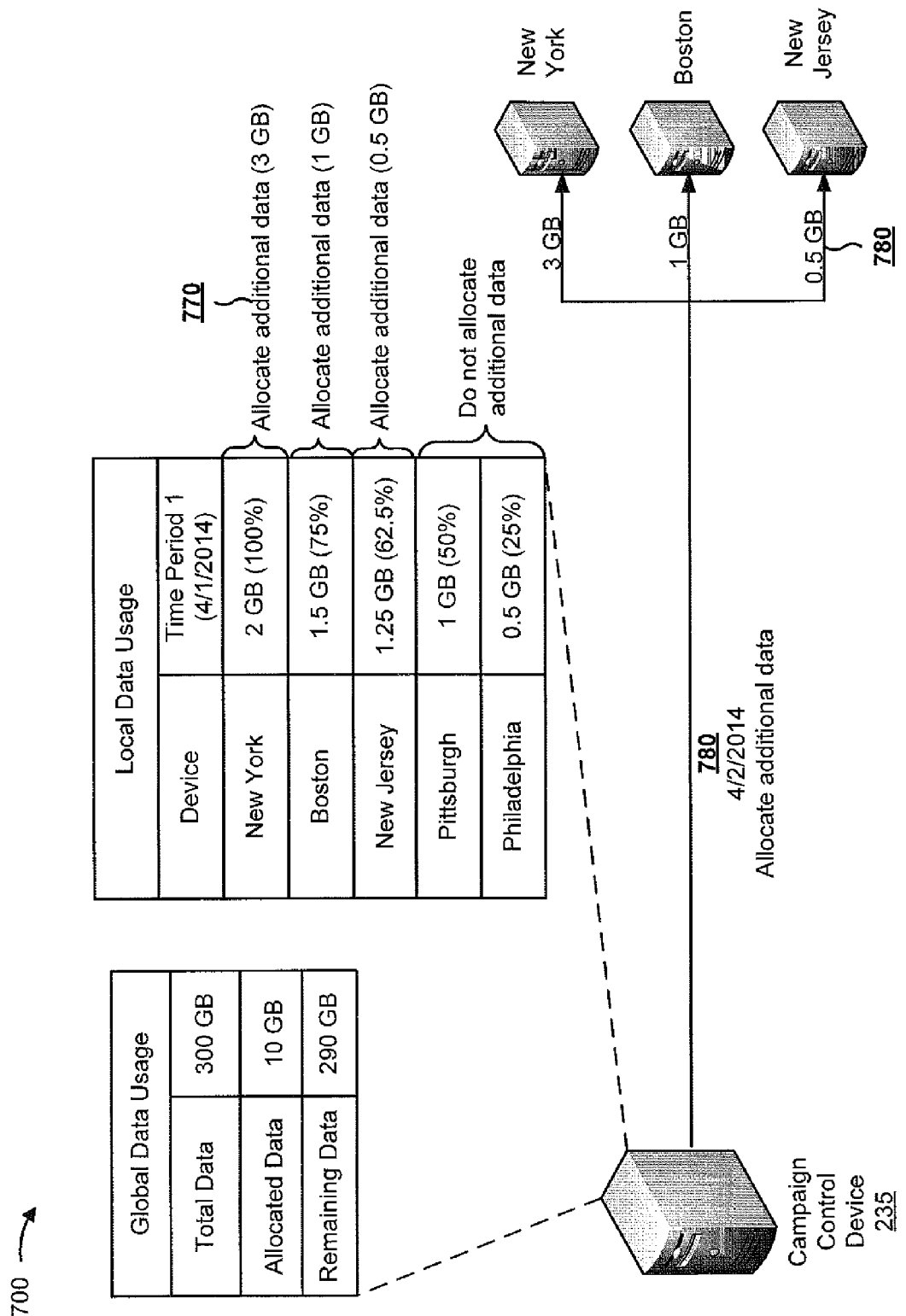

FIGS. 7A-7C are diagrams of an example implementation 700 relating to example process 600 shown in FIG. 6. FIGS. 7A-7C show an example of allocating additional data to a toll-free data service campaign based on data usage information. For the purpose of FIGS. 7A-7C, assume that the operations described herein in connection with FIGS. 5A and 5B have been performed.

As shown in FIG. 7A, and by reference number 710, assume that each of the campaign enforcement devices 230 located in the Northeast United States provide data usage information, for data usage on Apr. 1, 2014, to campaign control device 235. For example, assume that campaign enforcement device 230 located in New York provides an indication that 2 GB of data (100% of the allocated 2 GB) was consumed, that campaign enforcement device 230 located in Boston provides an indication that 1.5 GB of data (75% of the allocated 2 GB) was consumed, that campaign enforcement device 230 located in New Jersey provides an indication that 1.25 GB of data (62.5% of the allocated 2 GB) was consumed, that campaign enforcement device 230 located in Pittsburgh provides an indication that 1 GB of data (50% of the allocated 2 GB) was consumed, and that campaign enforcement device 230 located in Philadelphia provides an indication that 0.5 GB of data (25% of the allocated 2 GB) was consumed. As shown by reference number 720, assume that campaign control device 235 receives this data usage information.

As shown in FIG. 7B, and by reference number 730, assume that campaign control device 235 monitors an amount of remaining data available to be allocated. For example, campaign control device 235 determines that a maximum of 300 GB of data is associated with the campaign, that 10 GB of data has been allocated (e.g., as described in connection with FIGS. 5A and 5B), and that 290 GB of data remains as available to be allocated. Thus, campaign control device 235 determines that additional data is available to be allocated.

As shown by reference number 740, assume that campaign control device 235 uses the received data usage information to determine an amount of additional data to be allocated to campaign enforcement devices 230 during a subsequent time period (e.g., Apr. 2, 2014). For example, assume that campaign control device 235 determines, based on a set of allocation rules, that campaign enforcement devices 230 that consumed all of the allocated data (e.g., all 2 GB) are to be allocated 3 GB of additional data, that campaign enforcement devices 230 that consumed more than 50% of the allocated data (e.g., more than 1 GB of the allocated 2 GB) are to be allocated 2 GB of additional data, and that campaign enforcement devices 230 that consumed 50% or less of the allocated data (e.g., equal to or less than 1 GB of the allocated 2 GB) are not to be assigned additional data.

Thus, as shown by reference number 750, assume that campaign control device 235 determines to allocate 3 GB of additional data to campaign enforcement device 230 located in New York, determines to allocate 2 GB of additional data to campaign enforcement devices 230 located in Boston and New Jersey, and determines not to allocate additional data to campaign enforcement devices 230 located in Pittsburgh and Philadelphia. As shown by reference number 760, assume that campaign control device 235 allocates the additional data for the second day of the campaign (e.g., Apr. 2, 2014).

FIG. 7C shows an example where campaign control device 235 determines an amount of additional data to be allocated to campaign enforcement devices 230 based on a different set of allocation rules than those described in connection with FIG. 7B. For example, assume that the allocation rules indicate that additional data is to be allocated to maintain data usage at or near 100% of total allocated data for the second time period. Thus, as shown by reference number 770, assume that campaign control device 235 determines to allocate 3 GB of additional data to campaign enforcement device 230 located in New York (e.g., because more than 2 GB is needed to support data consumption by mobile devices 205 in a single day), determines to allocate 1 GB of additional data to campaign enforcement device 230 located in Boston (e.g., adds 1 GB to the remaining allocation of 0.5 GB to reach the daily consumption of 1.5 GB in Boston), and determines to allocate 0.5 GB of additional data to campaign enforcement device 230 located in New Jersey (e.g., adds 0.5 GB to the remaining allocation of 0.75 GB to reach the daily consumption of 1.25 GB in New Jersey). As shown by reference number 780, assume that campaign control device 235 allocates these additional amounts of data to campaign enforcement devices 230.

As indicated above, FIGS. 7A-7C are provided merely as an example. Other examples are possible and may differ from what was described with regard to FIGS. 7A-7C.

Figure 8A:
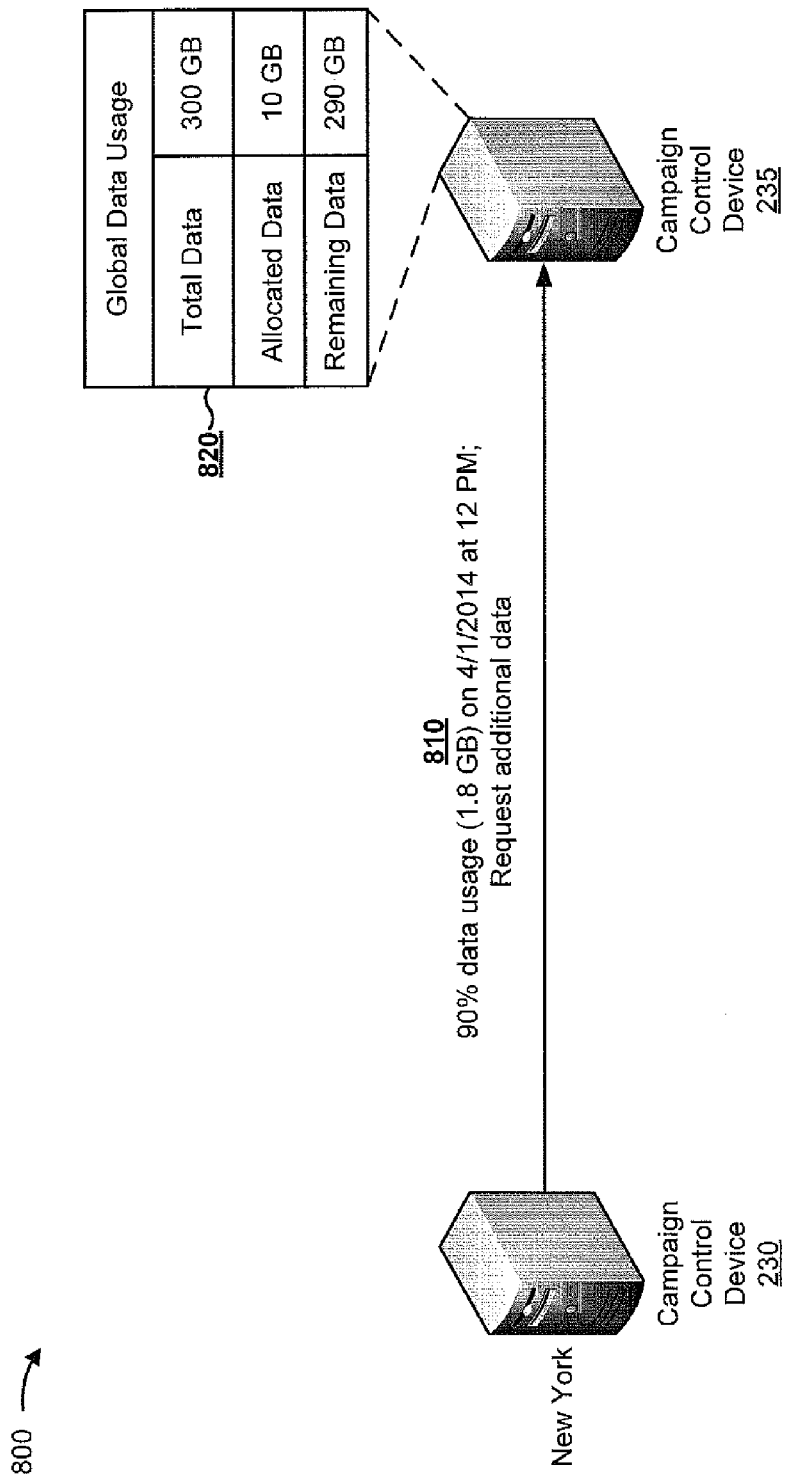
FIGS. 8A and 8B are diagrams of another example implementation relating to the example process shown in FIG. 6.
Figure 8B:
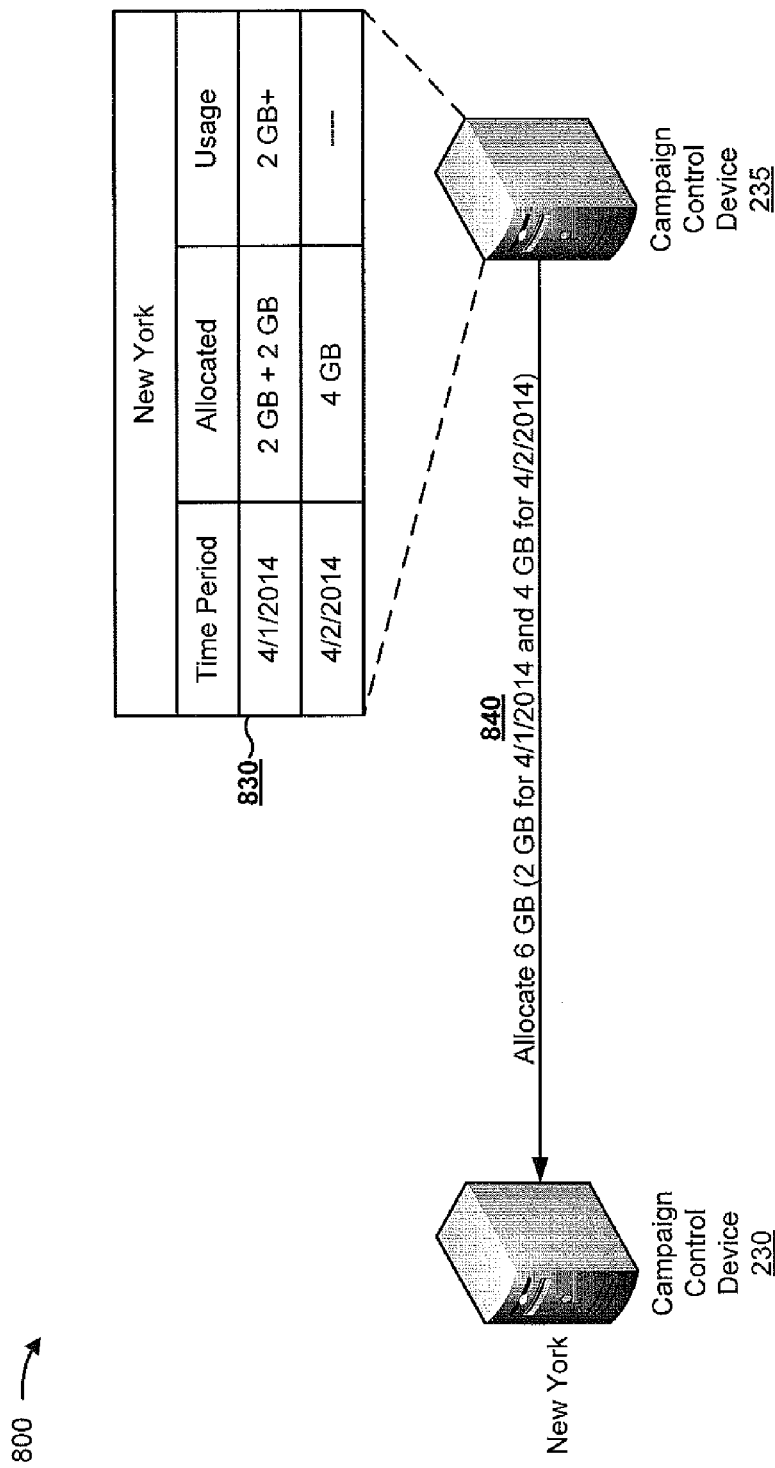

FIGS. 8A and 8B are diagrams of another example implementation 800 relating to example process 600 shown in FIG. 6. FIGS. 8A and 8B show another example of allocating additional data to a toll-free data service campaign based on data usage information. For the purpose of FIGS. 8A and 8B, assume that the operations described herein in connection with FIGS. 5A and 5B have been performed.

As shown in FIG. 8A, and by reference number 810, assume that campaign enforcement device 230 located in New York detects that 90% (1.8 GB) of the 2 GB of allocated data has been consumed as of 12:00 pm on Apr. 1, 2014. Based on this 90% threshold being satisfied (e.g., as specified by a set of allocation rules), assume that campaign enforcement device 230 requests additional data from campaign control device 235, and provides the above data usage information to campaign control device 235. As shown by reference number 820, assume that campaign control device 235 determines that additional data is available to be allocated to campaign control device 230 located in New York.

As shown in FIG. 8B, and by reference number 830, assume that campaign control device 235 determines, based on the data usage information, an amount of additional data to be allocated to campaign enforcement device 230 located in New York. For example, assume that campaign control device 235 determines to allocate an additional 2 GB of data for the second half of the first day of the campaign (e.g., because 2 GB of data was consumed in the first half of the first day), and further determines to allocate 4 GB of data for the second day of the campaign, for a total of 6 GB. As shown by reference number 840, assume that campaign control device 235 allocates the 6 GB of additional data to campaign enforcement device 230 located in New York. In this way, campaign control device 235 may reduce an amount of traffic between campaign control device 235 and campaign enforcement device 230, by reducing the likelihood that campaign enforcement device 230 will need to request additional data on the second day of the campaign. For example, campaign control device 235 may allocate data based on a predicted need for data (e.g., in addition to a current need for data).

As indicated above, FIGS. 8A and 8B are provided merely as an example. Other examples are possible and may differ from what was described with regard to FIGS. 8A and 8B.

Implementations described herein may assist in efficiently allocating data, to be consumed in association with a toll-free data service campaign, to different campaign enforcement devices (e.g., associated with different geographic regions). For example, implementations described herein may balance data usage across different campaign enforcement devices, may maintain data usage at or near 100% across different campaign enforcement devices, and may reduce an amount of traffic between a campaign control device and multiple campaign enforcement devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
   a communication interface; and one or more processors, communicatively coupled to the communication interface, to:
  receive campaign information for deploying a toll-free data service campaign,
    the campaign information identifying a total amount of data to be allocated for a toll-free data service associated with the toll-free data service campaign;
  determine a plurality of campaign enforcement devices associated with the toll-free data service campaign;
  allocate a portion of data, of the total amount of data, to a campaign enforcement device of the plurality of campaign enforcement devices;
  receive, from the campaign enforcement device, data usage information that indicates an amount of the portion of data consumed during a first time period, by mobile devices associated with the campaign enforcement device, in association with the toll-free data service campaign;
  determine, based on the data usage information, an additional amount of data to be allocated to the campaign enforcement device; and
  allocate the additional amount of data to the campaign enforcement device.

2. The device of claim 1, where the one or more processors, when allocating the portion of data, are to:
  determine the portion of data based on a length of time during which the toll-free data service campaign is active and a quantity of campaign enforcement devices included in the plurality of campaign enforcement devices; and
  allocate the portion of data based on determining the portion of data.

3. The device of claim 1,
  where the one or more processors are further to:
    determine that a particular length of time has elapsed since the portion of data was allocated to the campaign enforcement device; and
    request the data usage information from the campaign enforcement device based on determining that the particular length of time has elapsed, and
  where the one or more processors, when receiving the data usage information, are to:
    receive the data usage information based on requesting the data usage information.

4. The device of claim 1, where the one or more processors, when allocating the additional amount of data, are to:
  determine that a particular length of time has elapsed since the portion of data was allocated to the campaign enforcement device; and
  allocate the additional amount of data based on determining that the particular length of time has elapsed.

5. The device of claim 1, where the one or more processors, when allocating the additional amount of data, are to:
  receive a notification, from the campaign enforcement device, that a threshold amount of the portion of data has been consumed; and
  allocate the additional amount of data based on receiving the notification that the threshold amount of the portion of data has been consumed.

6. The device of claim 1, where the one or more processors, when allocating the additional amount of data, are to:
  receive a request, from the campaign enforcement device, for additional data;
  determine that the total amount of data includes unallocated data; and
  allocate the additional amount of data based on receiving the request and further based on determining that the total amount of data includes unallocated data.

7. The device of claim 1, where the one or more processors, when determining the additional amount of data to be allocated, are to:
  determine a percentage of the portion of data consumed during the first time period; and
  determine the additional amount of data based on the percentage of the portion of data consumed during the first time period.

8. A computer-readable medium storing instructions, the instructions comprising:
  one or more instructions that, when executed by one or more processors, cause the one or more processors to:
    receive campaign information for deploying a toll-free data service campaign,
      the campaign information identifying a total amount of data to be allocated for a toll-free data service associated with the toll-free data service campaign;
    determine a plurality of campaign enforcement devices associated with the toll-free data service campaign;
    allocate a first amount of data, of the total amount of data, to a first campaign enforcement device of the plurality of campaign enforcement devices;
    allocate a second amount of data, of the total amount of data, to a second campaign enforcement device of the plurality of campaign enforcement devices,
      a sum of the first amount of data and the second amount of data being less than the total amount of data;
    receive, from the first campaign enforcement device, data usage information that indicates a quantity of the first amount of data that was consumed, by mobile devices associated with the first campaign enforcement device, for the toll-free data service during a first time period;
    determine, based on the data usage information, an additional amount of data to be allocated to the first campaign enforcement device or the second campaign enforcement device; and
    allocate the additional amount of data to the first campaign enforcement device or the second campaign enforcement device.

9. The computer-readable medium of claim 8, where the one or more instructions, that cause the one or more processors to determine the additional amount of data, cause the one or more processors to:
  compare the quantity, of the first amount of data that was consumed, to a threshold amount;
  determine that the quantity satisfies the threshold amount; and
  determine the additional amount of data as an amount that is greater than the first amount of data based on determining that the quantity satisfies the threshold amount.

10. The computer-readable medium of claim 8, where the one or more instructions, that cause the one or more processors to determine the additional amount of data, cause the one or more processors to:
  compare the quantity, of the first amount of data that was consumed, to a threshold amount;
  determine that the quantity does not satisfy the threshold amount; and determine the additional amount of data as an amount that is less than the first amount of data based on determining that the quantity does not satisfy the threshold amount.

11. The computer-readable medium of claim 8, where the one or more instructions, that cause the one or more processors to determine the additional amount of data, cause the one or more processors to:
   determine, based on the data usage information, an expected amount of data predicted to be consumed during a second time period; and
where the one or more instructions, that cause the one or more processors to allocate the additional amount of data, cause the one or more processors to:
   allocate the expected amount of data to the first campaign enforcement device.

12. The computer-readable medium of claim 8, where the one or more instructions, that cause the one or more processors to determine the additional amount of data, cause the one or more processors to:
   determine a length of the first time period; and
   determine the additional amount of data based on the data usage information and the length of the first time period.

13. The computer-readable medium of claim 8, where the additional amount of data is not equal to the first amount of data.

14. The computer-readable medium of claim 8, where the campaign information identifies a geographic region associated with the toll-free data service campaign, and
where the one or more instructions, that cause the one or more processors to determine the plurality of campaign enforcement devices, cause the one or more processors to:
   determine the plurality of campaign enforcement devices associated with the geographic region.

15. A method, comprising:
   receiving, by a control device, campaign information for deploying a toll-free data service campaign,
      the campaign information identifying a total amount of data to be allocated for a toll-free data service associated with the toll-free data service campaign;
   allocating, by the control device, an initial amount of data, of the total amount of data, to an enforcement device of a plurality of enforcement devices associated with the toll-free data service campaign;
   receiving, by the control device and from the enforcement device, data usage information that indicates a quantity of the initial amount of data that was consumed, by mobile devices associated with the enforcement device, for the toll-free data service during a first time period;
   determining, by the control device and based on the data usage information, an additional amount of data to be allocated to the enforcement device for a second time period,
      the additional amount of data being different from the initial amount of data; and
   allocating, by the control device, the additional amount of data to the enforcement device.

16. The method of claim 15, where determining the additional amount of data comprises:
   determining a length of the first time period; and
   determining the additional amount of data based on the length of the first time period and the quantity of the initial amount of data that was consumed during the first time period.

17. The method of claim 15, where allocating the additional amount of data comprises:
   receiving a notification, from the enforcement device, that a threshold amount of the initial amount of data has been consumed; and
   allocating the additional amount of data based on receiving the notification that the threshold amount of the initial amount of data has been consumed.

18. The method of claim 15, where allocating the additional amount of data comprises:
   receiving a request, from the enforcement device, for additional data;
   determining whether the total amount of data includes unallocated data; and
   allocating the additional amount of data based on receiving the request and further based on determining whether the total amount of data includes unallocated data,
      the additional amount of data being allocated when the total amount of data includes unallocated data.

19. The method of claim 15, where allocating the additional amount of data comprises:
   determining that a particular length of time has elapsed since the initial amount of data was allocated to the enforcement device; and
   allocating the additional amount of data based on determining that the particular length of time has elapsed.

20. The method of claim 15, further comprising:
   storing information that identifies the additional amount of data to be allocated to the enforcement device; and
   modifying the additional amount of data based on the data usage information to determine a modified additional amount of data,
      where allocating the additional amount of data comprises:
         allocating the modified additional amount of data to the enforcement device.

* * * * *